D. D. DECKER.
Fifth Wheel.

No. 96,898.                                Patented Nov. 16, 1869.

Witnesses  
Jno. A. Brooks  
Wm. F. Clark

Inventor  
D. D. Decker  
per Munn & Co  
Attorneys

United States Patent Office.

D. D. DECKER, OF SAUGERTIES, NEW YORK, ASSIGNOR TO HIMSELF AND W. B. DUBOIS.

*Letters Patent No. 96,898, dated November 16, 1869.*

IMPROVED CARRIAGE FIFTH-WHEEL.

The Schedule referred to in these Letters Patent and making part of the same

*To all whom it may concern:*

Be it known that I, D. D. DECKER, of Saugerties, in the county of Ulster, and State of New York, have invented a new and useful Improvement in Carriages; and I do hereby declare that the following is a full, clear, and exact description thereof, which will enable others skilled in the art to make and use the same, reference being had to the accompanying drawing, forming part of this specification.

Previous to my invention, the fifth-wheels of carriages and wagons have been constructed in a variety of ways, and numerous inventions in this part of vehicles have been suggested and made the subject of Letters Patent, all having for their proposed objects to render the apparatus designated the "fifth-wheel" capable of more efficiently serving the ends for which it is designed, and make it more durable, less liable to wear out of adjustment, and rattle, and simple and economic of manufacture.

It has been customary, in some instances, to make the bearing-plate an annulus, and in others merely a segment of a circle, while the bearing, in which the plate moves, has sometimes been made in one circular piece, and at others in two short segments of circles. Among the greatest objections found in the use of the ordinary fifth-wheel (in most common use) may be mentioned the collection of dirt in the flat exposed bearing-plate, the liability of the parts to quickly wear out of adjustment, and rattle, and their not serving in any manner to hold the running gear to the body of the vehicle, in the event of the linchpin breaking; and to overcome these and other difficulties, it has been suggested to make the "fifth-wheel" grooved, and so arrange it as to preclude the entrance of dirt, and enable it to perform the function of holding the body and running gear together, to a certain extent, in the event of any accident to the legitimate couplings of these parts; but in all the contrivances so far suggested, with which I am familiar, the grooved fifth-wheel has been so made as to be liable to soon wear out of adjustment, and rattle, and the whole apparatus has been too complex and costly to come into general use, in place of the old-fashioned structure.

Another objection to fifth-wheels, as heretofore made, has been that they have had either a definite limit to their extent of motion, or have been so made as to be free to turn entirely around.

Those of the first-named character are not equally well adapted to all vehicles, while those of the last-named permit the wheels of the vehicle to turn clear under, which, in some instances, (where the vehicle is not designed to permit this,) is liable to cause accidents.

As the fifth-wheel, like other distinct parts of carriage-work, is the subject of separate manufacture, and may be made and supplied to carriage-makers, it is a desideratum to have it so constructed that it will be adapted for use on either a carriage designed to turn entirely under the body, or a vehicle arranged to permit of only a limited extent of turning in the front axle.

To make a fifth-wheel which shall be adaptable, by adjustment, to any kind of vehicle, and one which shall be simple, economic of manufacture, free of the main objections found in those heretofore made, and which will always wear to fit, and not rattle, is the object of my invention, which consists—

First, in forming the bearing-plate and supports (or the bearing-surfaces) of a fifth-wheel, so as to fit to each other, on tapering ways, somewhat after the fashion of the ways and carriage of a lathe, so that they will interlock laterally, and always keep a fit as the parts wear away, as will be presently more fully explained; and Secondly, in the employment, in connection with bearing-plates, of adjustable or variable stops, so arranged that by a simple set-screw, their positions may be so varied as to give to the fifth-wheel any desired capacity of motion, according to the character of the vehicle to which it may happen to be applied, as will be presently more fully explained.

To enable those skilled in the art to make and use my invention, I will proceed to describe the construction and operation of one of my improved fifth-wheels, referring, by letters, to the accompanying drawings, in which—

Figure 1:
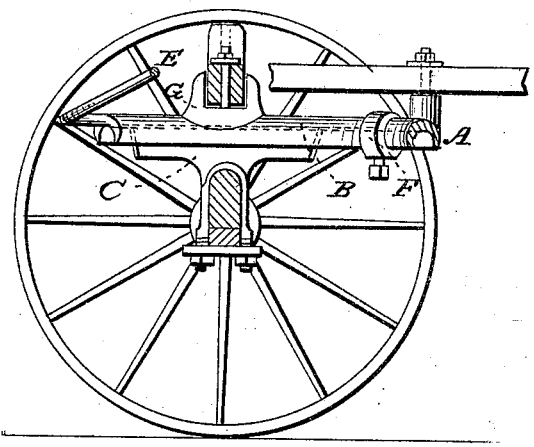
Figure 1 is a vertical cross-section (through the centre of the axle) of the front part of the running gear of a vehicle provided with my invention.
Figure 2:
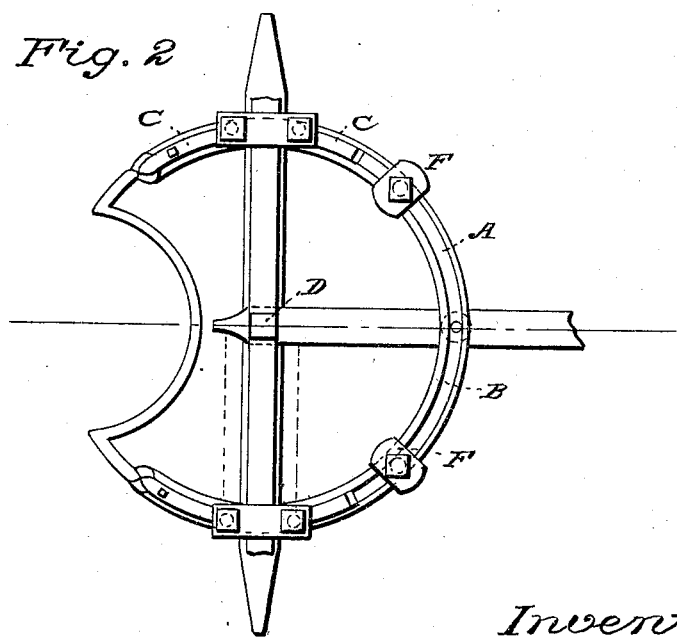
Figure 2 is a bottom view of same.

In the several figures, the same part is designated by the same letter of reference.

B is the fifth-wheel, or upper annular bearing-plate, which is arranged in the usual relative position to the axle-tongue, and which rests upon two bearing-brackets C C, which are secured, as illustrated, to the axle.

E is a bolster or cross-bar, arranged diametrically over the plate B, and resting near each end in a seat formed in one of the clips or sleeves G. These sleeves G are each grooved in the under side, to fit the convex top surface of plate B, and, by means of bolts passing downward through the bolster and the sleeves, into the plate B, these three parts of the mechanism are firmly secured together.

A bolt, D, is passed down through the centre of bolster E, and the axle, around which the parts move axially, and which serves to hold the bearing-plates together.

F F are adjustable sleeves or stops, which are fitted to slide on the plate B, and provided with set-screws, by means of which they are clamped or fastened at any given point in said plate B, so that they will check the movement of the bearing-brackets C, as they travel around with the axle.

By shifting the position of these stops F, or setting them at different points, the turning capacity of the fifth-wheel, it will be seen, may be restricted or increased, to adapt it to any particular design of vehicle.

The groove A, in the lower face of plate B, I have shown of an arch-form, (in cross-section,) as this is the simplest shape to swage it into, in forging the plate, and the upper (bearing) surfaces of brackets C are made to conform to this shape, so that the two fit together, and it will be seen, that by this or an analogous shape, a sort of taper bearing is produced, so that the parts will always fit, as they wear away. Of course, this groove A may be made V-shaped, or of any design in which the surfaces shall converge as they extend up from each lower edge of the groove, so as to embody the capacity of effecting a constant and perfect fit, as the bearing-surfaces wear away in each other.

The plate B, made as shown, as well as the other parts, is exceedingly simple and economic of manufacture, while the whole structure possesses great advantages over other fifth-wheels, as heretofore made.

In my improved mechanism, the bearing-groove is sufficiently protected, and will clear itself of dirt; no packings of any kind are necessary; the parts are so interlocked as to render the vehicle safe in the event of the temporary loss of the linchpin, and there is no liability of derangement of the parts, while the whole is so simple that carriage-makers can apply it as readily, without extra expense or trouble, as the common fifth-wheel now in general use.

Having fully described the several features of my invention,

What I claim as new, and desire to secure by Letters Patent, is—

1. A fifth-wheel, having a groove in its under face, of substantially the form shown and described, and adapted to turn on supporting-brackets, as and for the purposes described.

2. The employment, in combination with a fifth-wheel, of adjustable stops, for varying the throw or extent of turning of the mechanism, as and for the purposes explained.

The above specification of my invention signed by me, this 12th day of March, 1869.

D. D. DECKER.

Witnesses:
WM. R. SHEFFIELD,
SAMUEL MERCHAN.